(12) United States Patent
Kim et al.

(10) Patent No.: US 7,072,121 B2
(45) Date of Patent: Jul. 4, 2006

(54) ZOOM LENS

(75) Inventors: Jae-bum Kim, Changwon-si (KR);
Young-ran Kim, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/016,315

(22) Filed: Dec. 17, 2004

(65) Prior Publication Data
US 2005/0157404 A1    Jul. 21, 2005

(30) Foreign Application Priority Data
Jan. 20, 2004    (KR) ................. 10-2004-0004411

(51) Int. Cl.
*G02B 15/14* (2006.01)
(52) U.S. Cl. ................................ 359/689
(58) Field of Classification Search ............... 359/683, 359/689
See application file for complete search history.

(56) References Cited

U.S. PATENT DOCUMENTS 5,274,504 A * 12/1993 Itoh ............................ 359/676
5,305,148 A * 4/1994 Ikemori et al. ............. 359/689
5,539,582 A * 7/1996 Kohno et al. ............... 359/689

FOREIGN PATENT DOCUMENTS

| JP | 02-063007 A | 3/1990 |
|---|---|---|
| JP | 06-094996 A | 4/1994 |
| JP | 2000-338425 A | 8/2000 |
| JP | 2003-322796 A | 11/2003 |

* cited by examiner

*Primary Examiner*—Scott J. Sugarman
(74) *Attorney, Agent, or Firm*—Gardner Carton & Douglas LLP

(57) ABSTRACT

A zoom lens is provided. The zoom lens includes a first lens group having a negative refractive power, a second lens group having a positive refractive power, and a third lens group having a negative refractive power. Here, the first through third lens groups are sequentially arranged from an object side toward an image side. At least the second lens group is moved along an optical axis to change magnification. The expression $$3.7 < \frac{L_T}{F_W} < 5.4$$

is satisfied, where $L_T$ denotes a distance on the optical axis from an object-side plane of the first lens group to an image plane at a wide-angle end, and $F_W$ denotes an overall focal length of the zoom lens at the wide-angle end. Accordingly, the zoom lens is miniaturized and minimizes a change in aberration due to high magnification.

20 Claims, 18 Drawing Sheets

I (WIDE-ANGLE END)

I (MEDIUM-ANGLE END)

I (TELEPHOTO END)

I (WIDE-ANGLE END)

I (MEDIUM-ANGLE END)

I (TELEPHOTO END)

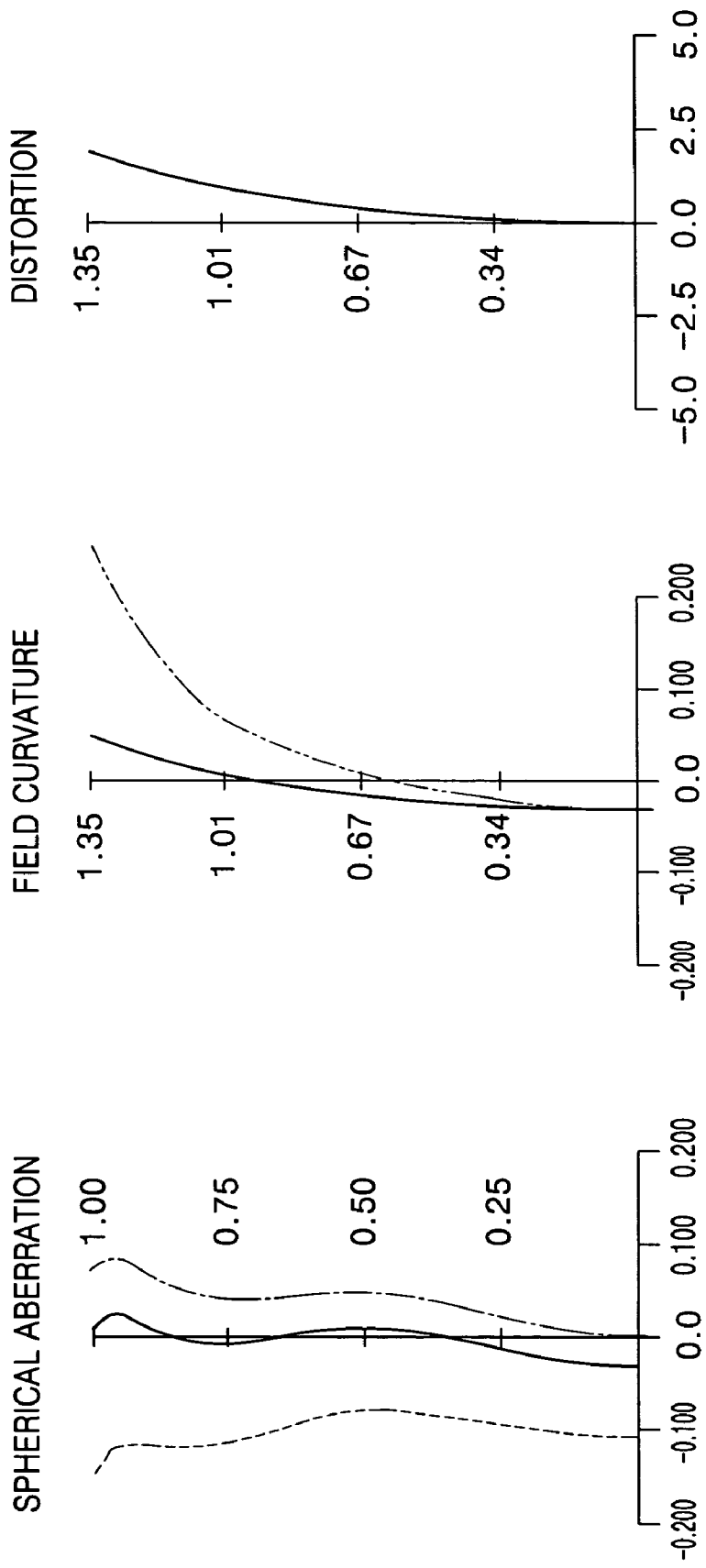

I (WIDE-ANGLE END)

I (MEDIUM-ANGLE END)

I (TELEPHOTO END)

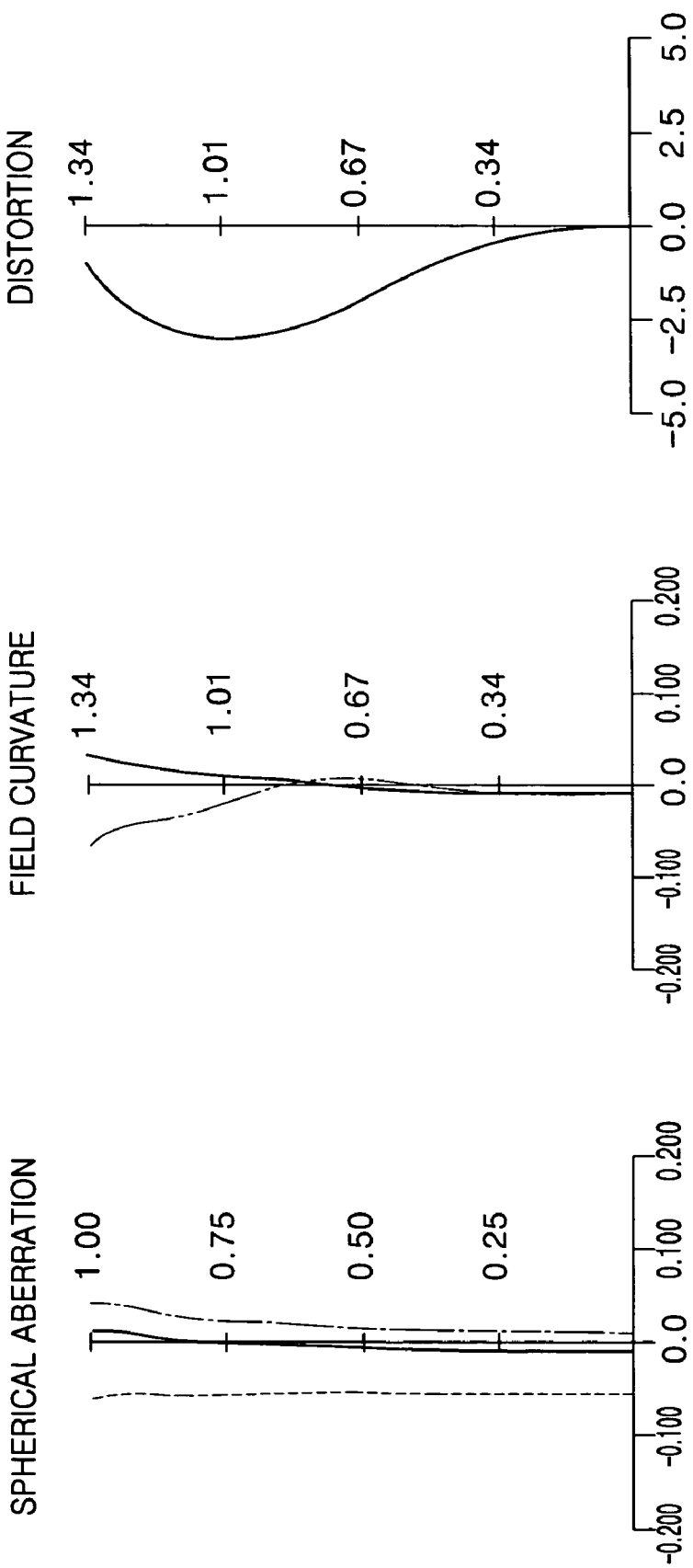

I (WIDE-ANGLE END)

I (MEDIUM-ANGLE END)

I (TELEPHOTO END)

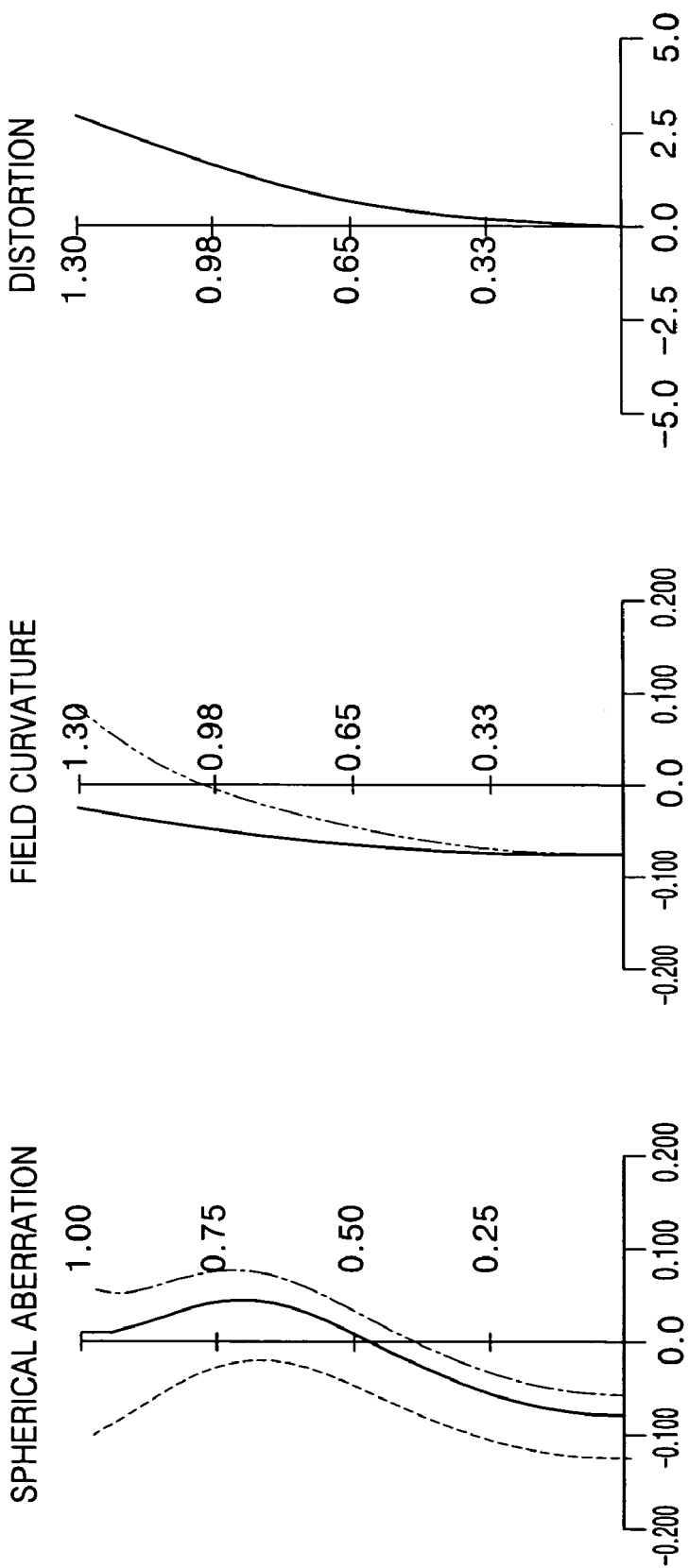

I (WIDE-ANGLE END)

I (MEDIUM-ANGLE END)

I (TELEPHOTO END)

ZOOM LENS

This application claims the priority of Korean Patent Application No. 2004-4411, filed on Jan. 20, 2004, in the Korean Intellectual Property Office, the disclosure of which is incorporated herein in its entirety by reference.

BACKGROUND OF THE INVENTION

1. Field of the Invention

The present invention relates to a zoom lens, and more particularly, to a zoom lens that is compact and has high magnification with optical performance maintained or increased.

2. Description of the Related Art

Generally, a zoom lens used in a still camera or a video camera requires excellent optical performance, high magnification, and compactness. With the wide spread of electronic equipment such as portable information terminals (e.g., personal digital assistants (PDAs)) and mobile terminals, digital cameras and digital video units are increasingly being installed in such electronic equipment. As a result, the demand for increasingly compact cameras continues to grow.

A conventional compact zoom lens is disclosed in Japanese Patent Publication Nos. 1990-063007 and 1994-094996. As shown in FIGS. 1A and 1B, the conventional compact zoom lens includes a first lens group I, a second lens group II, and a third lens group III, each of which includes a plurality of lenses to compensate for aberration at a high magnification. However, since each lens group includes a plurality of lenses, there is a limitation in reducing the size of a zoom lens. In addition, since many lenses are used, the manufacturing cost is high.

Another conventional zoom lens is disclosed in Japanese Patent Publication No. 2003-322796. As shown in FIG. 2, the conventional zoom lens includes a first lens group L1, a second lens group L2, and a third lens group L3 and compensates for optical aberration using a diffraction optical element. However, since the ratio of the overall focal length at the wide-angle position to the overall optical distance of the zoom lens is great, the entire optical system is large. As a result, it is difficult to manufacture a compact zoom lens.

SUMMARY OF THE INVENTION

The present invention provides a compact zoom lens using a minimum number of lenses and having maintained or improved optical performance.

According to an aspect of the present invention, there is provided a zoom lens including a first lens group having a negative refractive power, a second lens group having a positive refractive power, and a third lens group having a negative refractive power, wherein the first through third lens groups are sequentially arranged from an object side toward an image side. At least the second lens group is moved along an optical axis to change magnification. The expression $$3.7 < \frac{L_T}{F_W} < 5.4$$

is satisfied, where $L_T$ denotes a distance on the optical axis from an object-side plane of the first lens group to an image plane at a wide-angle end, and $F_W$ denotes an overall focal length of the zoom lens at the wide-angle end.

According to another aspect of the present invention, there is provided a zoom lens including a first lens group having a negative refractive power, a second lens group having a positive refractive power, and a third lens group having a negative refractive power, wherein the first through third lens groups are sequentially arranged from an object side toward an image side. At least the second lens group is moved along an optical axis to change magnification. The expression $$0.85 < \left|\frac{F_2}{F_W}\right| < 1.20$$

is satisfied, where $F_2$ denotes a focal length of the second lens group, and $F_W$ denotes an overall focal length of the zoom lens at a wide-angle end.

When a focal length of the first lens group is represented with $F_1$, the first lens group satisfies $$1.20 < \left|\frac{F_1}{F_W}\right| < 2.10.$$

When a focal length of the third lens group is represented with $F_3$, the third lens group satisfies $$1.38 < \left|\frac{F_3}{F_W}\right| < 3.00.$$

When a radius of curvature of an image-side plane of the first lens group is represented with G1B, the first lens group satisfies $$0.50 < \frac{G1B}{F_W} > 0.95.$$

The image-side plane of the first lens group is concave, the second lens group is double convex, and an object-side plane of the third lens group is concave.

According to still another aspect of the present invention, there is provided a zoom lens including a first lens group having a negative refractive power, a second lens group having a positive refractive power, and a third lens group having a negative refractive power, wherein the first through third lens groups are sequentially arranged from an object side toward an image side. At least the second lens group is moved along an optical axis to change magnification. The first lens group satisfies $$1.20 < \left|\frac{F_1}{F_W}\right| < 2.10,$$

where $F_1$ denotes a focal length of the first lens group and $F_W$ denotes an overall focal length of the zoom lens at a wide-angle end.

BRIEF DESCRIPTION OF THE DRAWINGS

The above and other features and advantages of the present invention will become more apparent by describing in detail preferred embodiments thereof with reference to the attached drawings in which:

FIG. 6B illustrates spherical aberration, field curvature, and distortion at the telephoto end of the zoom lens according to the second embodiment of the present invention;

FIG. 8A illustrates spherical aberration, field curvature, and distortion at the wide-angle end of the zoom lens according to the third embodiment of the present invention;

FIG. 10B illustrates spherical aberration, field curvature, and distortion at the telephoto end of the zoom lens according to the fourth embodiment of the present invention;

DETAILED DESCRIPTION OF THE INVENTION

Figure 1A:
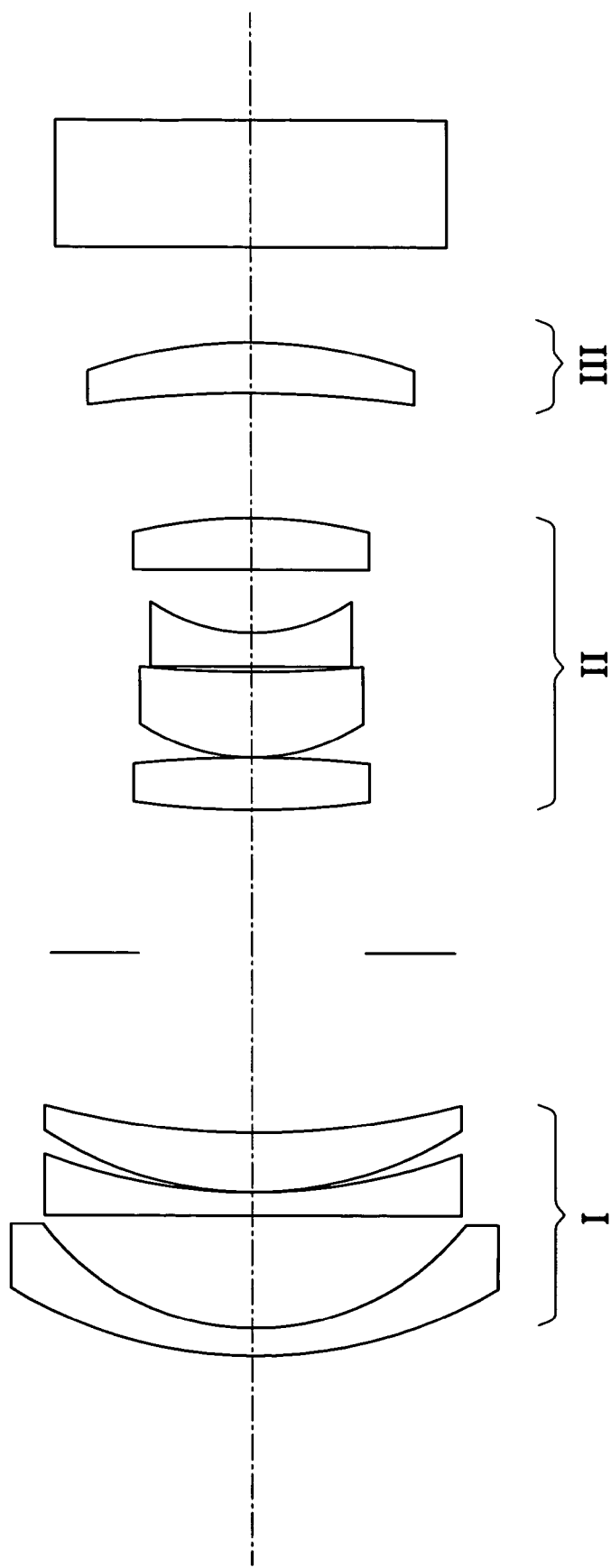
FIG. 1A illustrates a conventional zoom lens disclosed in Japanese Patent Publication No. 1994-94996.
Figure 1B:
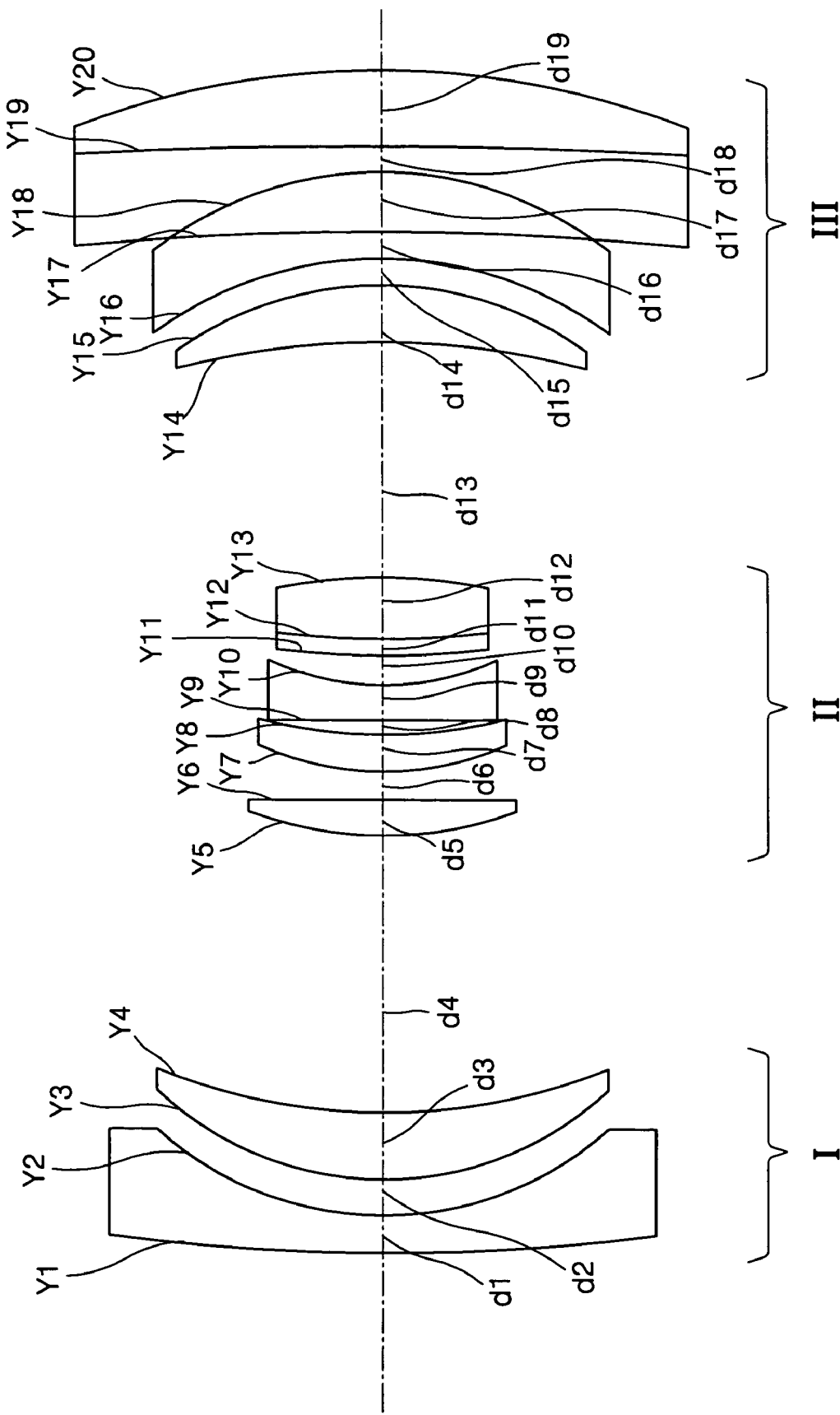
FIG. 1B illustrates a conventional zoom lens disclosed in Japanese Patent Publication No. 1990-63007.
Figure 2A:
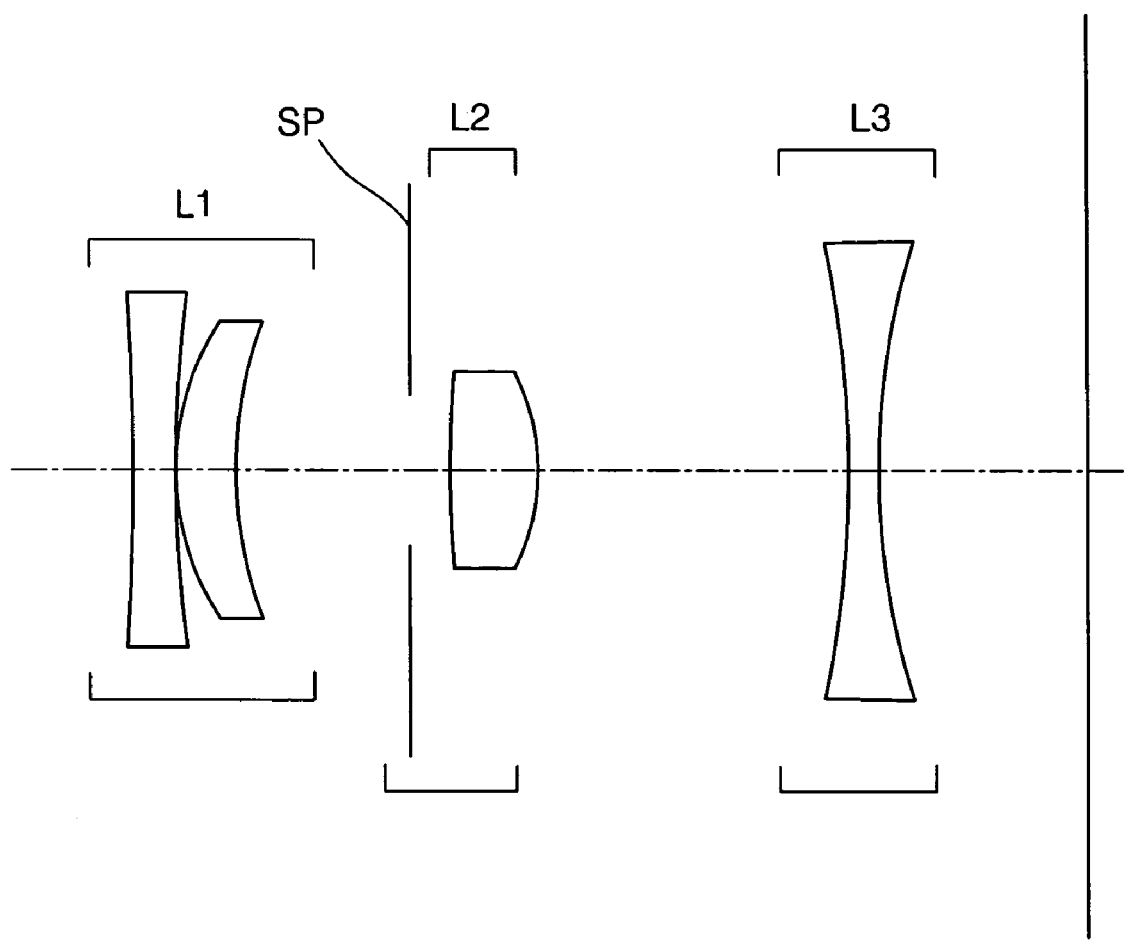
FIG. 2 illustrates a conventional zoom lens disclosed in Japanese Patent Publication No. 2003-322796.
Figure 3A:
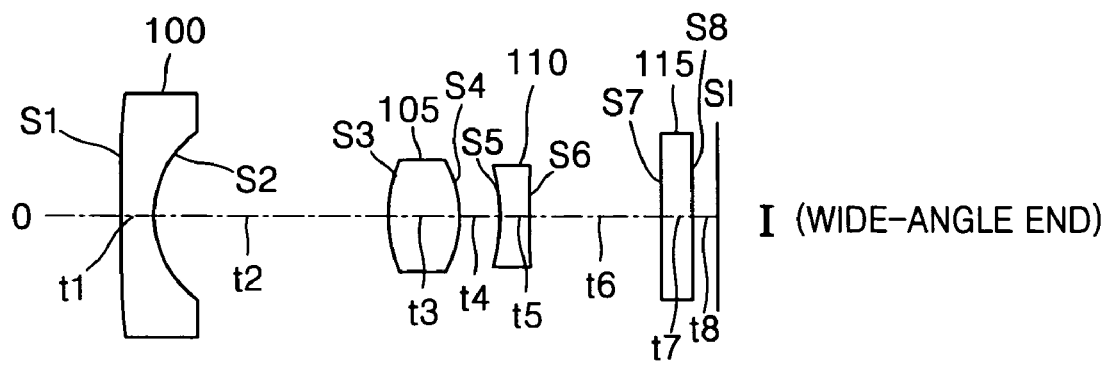
FIG. 3A illustrates optical disposition at a wide-angle end of a zoom lens according to a first embodiment of the present invention.
Figure 3B:
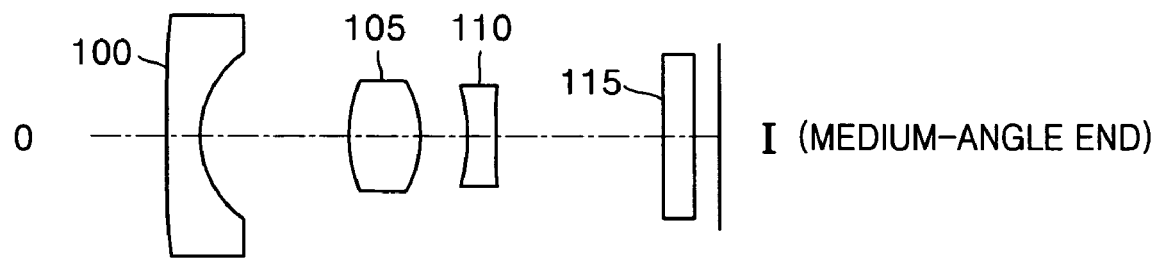
FIG. 3B illustrates optical disposition at a medium-angle end of the zoom lens according to the first embodiment of the present invention.
Figure 3C:
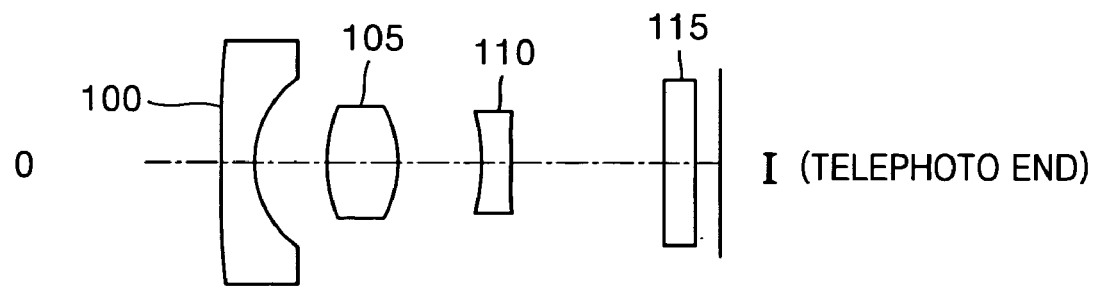
FIG. 3C illustrates optical disposition at a telephoto end of the zoom lens according to the first embodiment of the present invention.

Referring to FIGS. 3A through 3C, a zoom lens according to an embodiment of the present invention sequentially includes from an object side O to an image side I a first lens group 100 having a negative refractive power, a second lens group 105 having a positive refractive power, and a third lens group 110 having a negative refractive power.

Magnification is changed by moving at least one lens group among the first, second, and third lens groups 100, 105, and 110 along an optical axis. The second lens group 105 may be moved back and forth along the optical axis to change the magnification while the first and third lens groups 100 and 110 may be moved in association with the movement of the second lens group 105 to compensate for a shift of a focus position occurring during the magnification change.

In addition, a diaphragm ST (not shown) is provided on an object-side plane S3 or an image-side plane S4 of the second lens group 105. The diaphragm ST is fixed on a lens surface using a shield during manufacturing of a lens.

A zoom lens according to embodiments of the present invention may satisfy a condition shown in Formula (1) to reduce lens size and to minimize a change in aberration due to magnification change.

$$3.7 < \frac{L_T}{F_W} < 5.4 \qquad (1)$$

Here, $L_T$ denotes a distance on the optical axis from an object-side plane S1 of the first lens group 100 to an image plane SI at a wide-angle end (position), and $F_W$ denotes an overall focal length of the zoom lens at the wide-angle end. Formula (1) expresses a ratio of an overall focal length to an overall length of a lens system, that is, Formula (1) expresses a condition of miniaturization.

When the zoom lens has a value less than the lower limit shown in Formula (1), a principle ray of light flux with respect to each image point converges on an imaging surface of the lens system at a large angle. As a result, the quantity of marginal rays rapidly decreases. Conversely, when the zoom lens has a value greater than the higher limit shown in Formula (1), the overall length of the optical system of the zoom lens increases. As a result, it is difficult to miniaturize the zoom lens.

When the focal length of the second lens group 105 is represented with $F_2$ and an overall focal length of the zoom lens at the wide-angle end is represented with $F_W$, the second lens group 105 may have a refractive power satisfying Formula (2).

$$0.85 < \left|\frac{F_2}{F_W}\right| < 1.20 \quad (2)$$

Formula (2) expresses a condition of the refractive power of the second lens group 105. When the second lens group 105 has a value less than the lower limit shown in Formula (2), the refractive power of the second lens group 105 increases, which is advantageous in miniaturizing the zoom lens and decreases the amount of movement during magnification change. However, it is difficult to secure a back focal length. Conversely, when the second lens group 105 has a value greater than the higher limit shown in Formula (2), the amount of movement during magnification change and the overall length of the lens system increases. Accordingly, it is difficult to miniaturize the zoom lens.

When the focal length of the first lens group 100 is represented with $F_1$, the first lens group 100 may satisfy Formula (3).

$$1.20 < \left|\frac{F_1}{F_W}\right| < 2.10 \quad (3)$$

Formula (3) expresses a condition of the refractive power of the first lens group 100. When the first lens group 100 has a value less than the lower limit shown in Formula (3), the refractive power of the first lens group 100 increases, which is advantageous in miniaturizing the zoom lens. However, a curvature of the zoom lens increases, which increases distortion toward a wide angle and increases aberration during magnification change. Conversely, when the first lens group 100 has a value greater than the higher limit shown in Formula (3), the refractive power of the first lens group 100 decreases. Accordingly, the quantity of marginal rays decreases, and therefore, an aperture of the zoom lens needs to be increased. As a result, it is difficult to miniaturize the zoom lens.

When the focal length of the third lens group 110 is represented with $F_3$, the third lens group 110 may satisfy Formula (4).

$$1.38 < \left|\frac{F_3}{F_W}\right| < 3.00 \quad (4)$$

Formula (4) expresses a condition of the refractive power of the third lens group 110. When the third lens group 110 has a value less than the lower limit shown in Formula (4), the refractive power of the third lens group 110 increases. In this case, as described above, it is difficult to secure a back focal length. In addition, the lens structure becomes complicated in order to compensate for overall aberration of the lens system. As a result, it is difficult to miniaturize the zoom lens. Conversely, when the third lens group 110 has a value greater than the higher limit shown in Formula (4), the overall length of the lens system increases. Accordingly, it is difficult to miniaturize the zoom lens.

Meanwhile, the first and third lens groups 100 and 110 move together according to the movement of the second lens group 104 to compensate for a shift of a focus position occurring during magnification change.

Furthermore, when a radius of curvature of the image-side plane S2 of the first lens group 100 is represented with G1B, the first lens group 100 may satisfy Formula (5).

$$0.50 < \frac{G1B}{F_W} > 0.95 \quad (5)$$

Generally, when a lens group having a negative refractive power is positioned at an object side of a lens group having a positive refractive power, the negative refractive power needs to be great. However, when the first lens group 100 having the negative refractive power includes a single lens and an object-side plane of the first lens group 100 has a great refractive power, a refraction angle of incident light increases, causing on-axis aberration, off-axis aberration (e.g., field curvature or distortion), etc. Here, it is difficult to compensate for the aberration.

Accordingly, to overcome these problems when the first lens group 100 includes a single lens, the object-side plane of the lens may have a small refractive power while the image-side plane of the lens, on which a height of off-axis light decreases, may have a relatively great refractive power. In this case, off-axis aberration can be satisfactorily compensated for. This condition is expressed by Formula (5).

When a zoom lens has a value exceeding the higher limit shown in Formula (5), the curvature of an image-side plane of a lens decreases while the curvature of an object-side plane of the lens increases. As a result, it is difficult to compensate for distortion and field curvature. Conversely, when the zoom lens has a value less than the lower limit shown in Formula (5), the curvature of the object-side plane becomes so great that negative distortion increases.

To miniaturize a zoom lens, each of the first, second and third lens groups 100, 105, and 110 may consist of a single lens. According to embodiments of the present invention, a zoom lens includes lenses in various designs according to optimal conditions for miniaturization.

In various embodiments of the present invention, a zoom lens includes lenses satisfying optimizing conditions for miniaturization of the zoom lens. Detailed lens data used for a zoom lens in various embodiments of the present invention will be described below. Hereinafter, "f" denotes a combined focal length of an entire lens system, Fno denotes an F number, 2ω denotes a field angle, R denotes a radius of curvature, "t" denotes a thickness of a center of a lens or a distance between lenses, ND denotes a refractive index, and VD denotes an Abbe's number.

<First Embodiment>

FIGS. 3A through 3C illustrate a zoom lens according to a first embodiment of the present invention. FIG. 3A illustrates the zoom lens at a wide-angle end. FIG. 3B illustrates the zoom lens at a medium-angle end. FIG. 3C illustrates the zoom lens at a telephoto end.

Referring to FIG. 3A, the first lens group 100, the second lens group 105, and the third lens group 110 are sequentially arranged from the object side O toward the image side I. Each of the first, second and third lens groups 100, 105, and 110 may include a single lens. The second lens group 105 is moved for magnification change, and the first and third lens groups 100 and 110 are moved according to the movement of the second lens group 105, so that a distance t2 between the first and second lens groups 100 and 105, a distance t4 between the second and third lens groups 105 and 110, and a distance t6 between the third lens group 110 and a cover glass 115 change.

TABLE 1 f: 2.23–3.25–4.60 Fno: 2.85–3.31–3.76 2ω: 72.84–52.32–36.83

| | R | t | ND | VD |
|---|---|---|---|---|
| S1 | −123.82800 | 0.600000 | 1.53 | 55.8 |
| | K: 0.000000 | | | |
| | A: 0.408548E−02, B: −0.200807E−3, | | | |
| | C: 0.34127E−4, D: −0.259082E−05 | | | |
| S2 | 1.97300 | t2 (Variable) | | |
| S3 | 2.40000 | 1.260000 | 1.53 | 55.8 |
| | K: 0.000000 | | | |
| | A: −0.334190E−01, B: −0.193912E−01, | | | |
| | C: 0.961643E−02, D: −0.140967E−01 | | | |
| S4 (ST) | −2.23400 | t4 (Variable) | | |
| | K: 0.000000 | | | |
| | A: 0.249023E−02, B: 0.290263E−01, | | | |
| | C: −0.246276E−01, D: 0.976176E−02 | | | |
| S5 | −2.18300 | 0.550000 | 1.584 | 31.0 |
| | K: 0.000000 | | | |
| | A: 0.132349E+00, B: −0.110738E−01, | | | |
| | C: −0.348327E−01, D: 0.137762E−01 | | | |
| S6 | −5.23400 | t6 (Variable) | | |
| | K: 0.000000 | | | |
| | A: 0.128533E+00, B: 0.276307E−01, | | | |
| | C: −0.374803E−01, D: 0.120223E−01 | | | |
| S7 | Infinite | 0.550000 | 1.517 | 64.2 |
| S8 | Infinite | 0.508928 | | |
| SI | Infinite | 0 | | |

Table 2 shows examples of the variable distances t2, t4, and t6 in the first embodiment of the present invention.

TABLE 2

| Variable distance | Wide-angle end | Medium-angle end | Telephoto end |
|---|---|---|---|
| t2 | 4.255 | 2.718 | 1.361 |
| t4 | 0.721 | 0.848 | 1.498 |
| t6 | 2.389 | 2.927 | 2.719 |

Figure 4A:
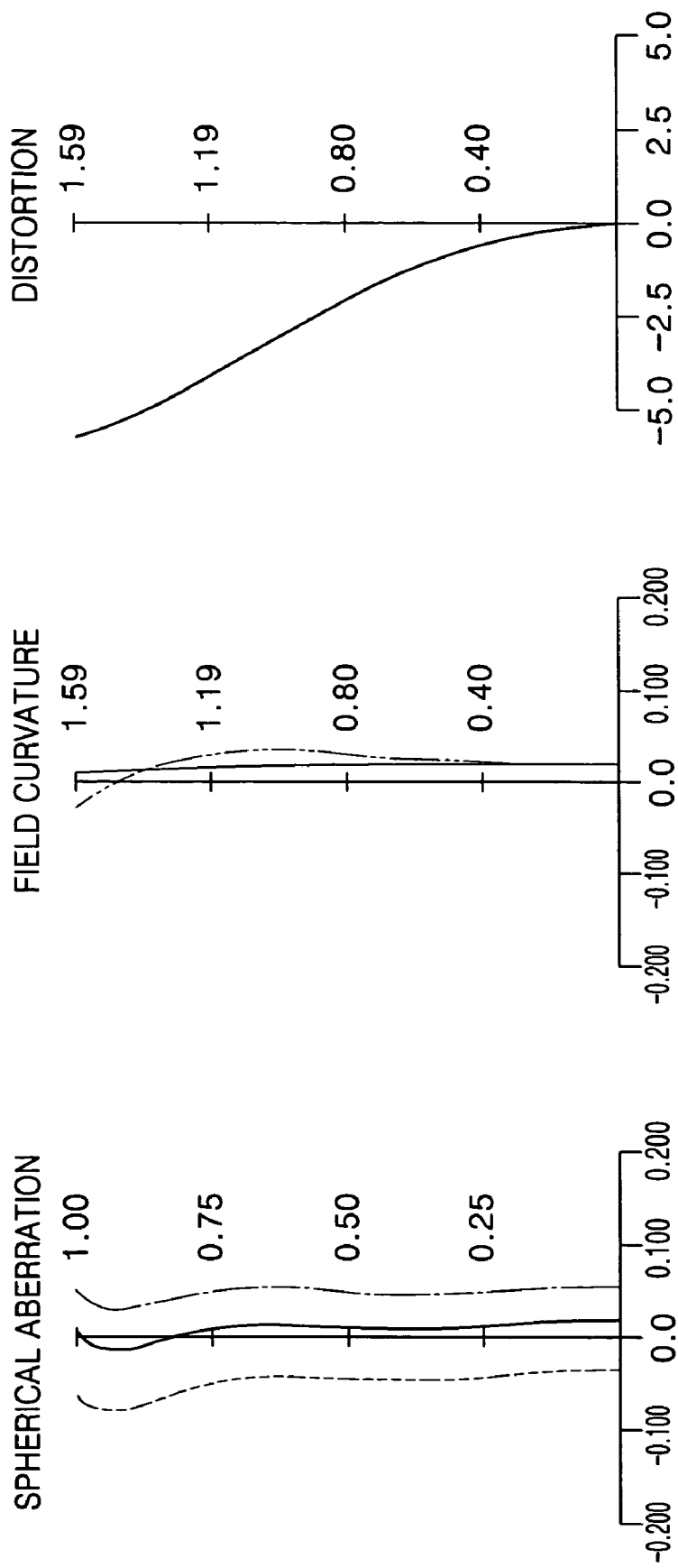
FIG. 4A illustrates spherical aberration, field curvature, and distortion at the wide-angle end of the zoom lens according to the first embodiment of the present invention.
Figure 4B:
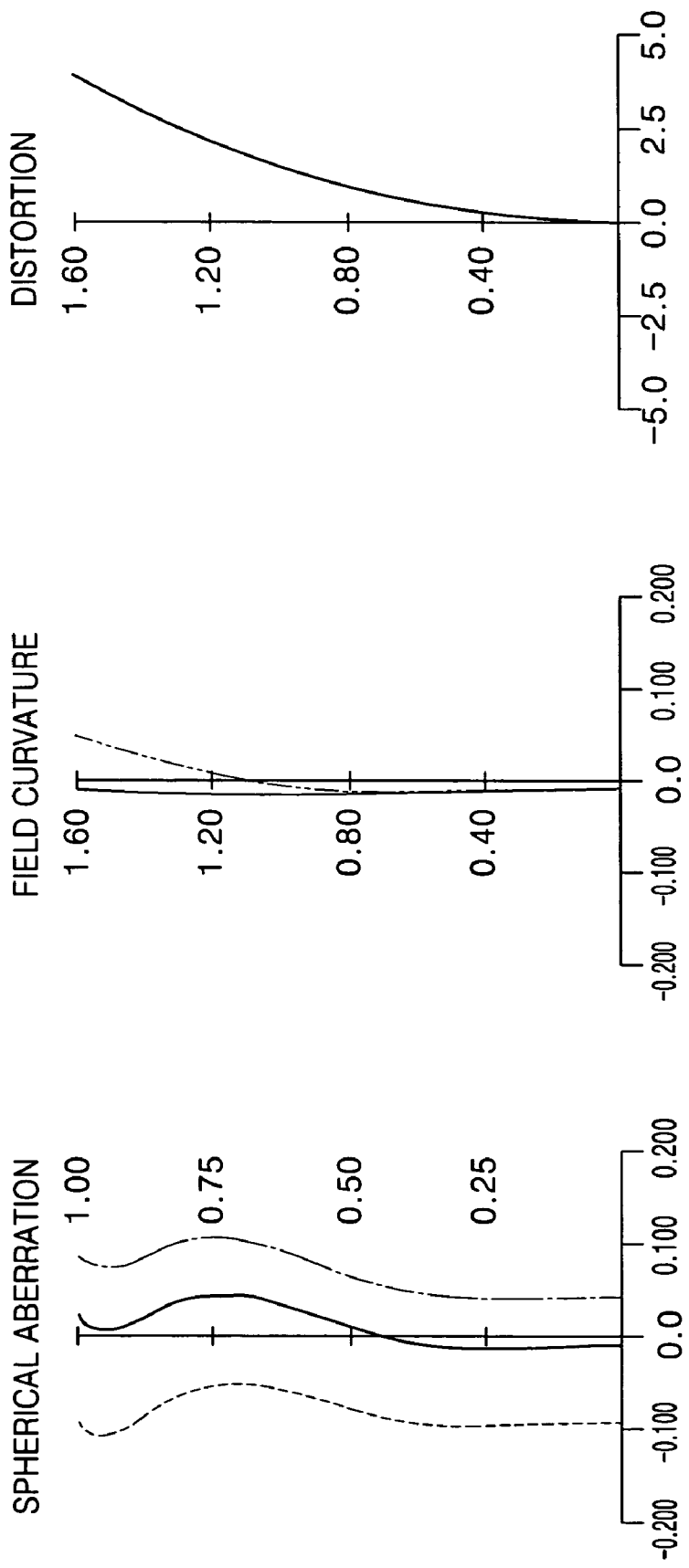
FIG. 4B illustrates spherical aberration, field curvature, and distortion at the telephoto end of the zoom lens according to the first embodiment of the present invention.

FIG. 4A illustrates spherical aberration, field curvature, and distortion at the wide-angle end of the zoom lens according to the first embodiment of the present invention. FIG. 4B illustrates spherical aberration, field curvature, and distortion at the telephoto end of the zoom lens according to the first embodiment of the present invention. The spherical aberration is shown with respect to a C_line, e_line, and F_line. The C_line is 656.3 nm, the d_line is 587.6 nm, and the F_line is 486.1 nm. In the graphs of field curvature, a solid line indicates aberration on a sagittal plane, and a dotted line indicates aberration on a tangential plane.

<Second Embodiment>

Figure 5A:
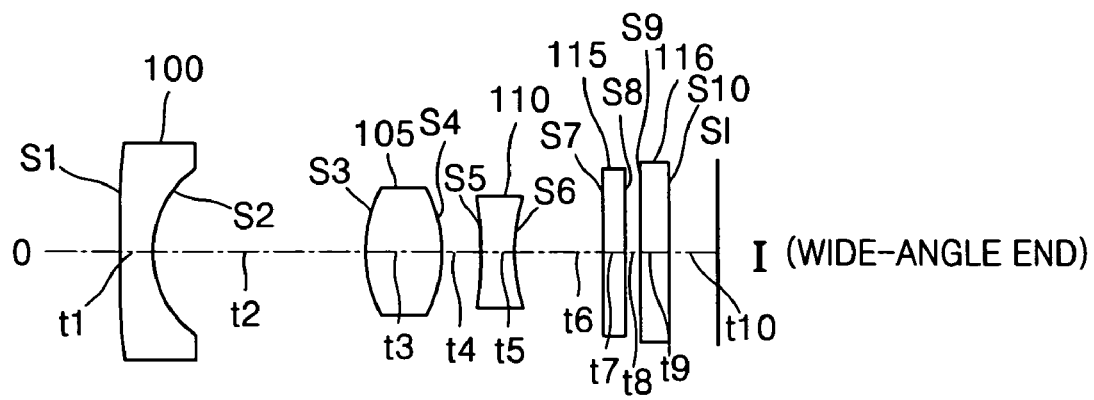
FIG. 5A illustrates optical disposition at a wide-angle end of a zoom lens according to a second embodiment of the present invention.
Figure 5B:
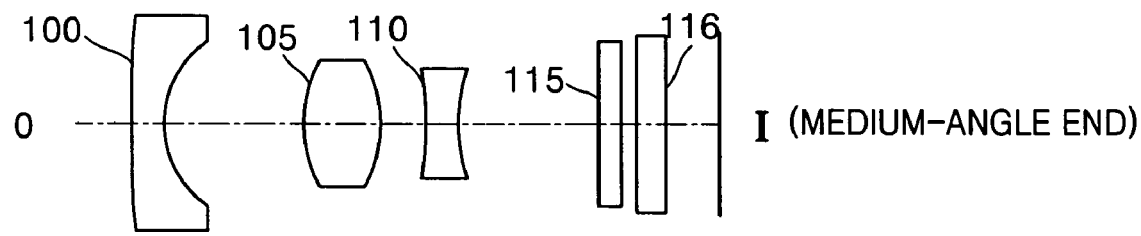
FIG. 5B illustrates optical disposition at a medium-angle end of the zoom lens according to the second embodiment of the present invention.
Figure 5C:
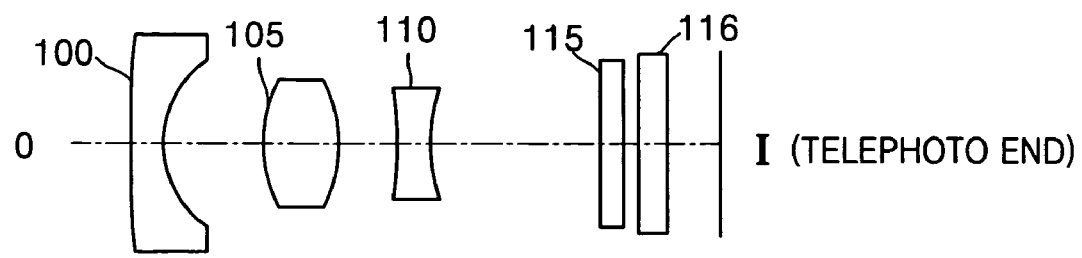
FIG. 5C illustrates optical disposition at a telephoto end of the zoom lens according to the second embodiment of the present invention.

FIGS. 5A through 5C illustrate structures of a zoom lens according to a second embodiment of the present invention. Reference numeral 115 denotes an infrared filter, and reference numeral 116 denotes a cover glass.

TABLE 3 f: 1.95–2.30–3.86 Fno: 2.90–3.56–4.07 2ω: 70.86–47.85–37.68

| | R | t | ND | VD |
|---|---|---|---|---|
| S1 | 44.98600 | 0.450000 | 1.5247 | 56.2 |
| | K: 0.000000 | | | |
| | A: 0.143830E−01, B: −0.560565E−02, | | | |
| | C: 0.334813E−02, D: −0.681595E−03 | | | |
| S2 | 1.27500 | t2 (Variable) | | |
| S3 (ST) | 1.51000 | 1.000000 | 1.5247 | 56.2 |
| | K: 0.000000 | | | |
| | A: −0.534260E−01, B: −0.223452E−01, | | | |
| | C: −0.343808E−01, D: −0.161967E−01 | | | |
| S4 | −2.06400 | t4 (Variable) | | |
| | K: 0.000000 | | | |
| | A: 0.218562E−02, B: −0.407056E−01, | | | |
| | C: 0.165920E−01, D: −0.257194E−01 | | | |
| S5 | −9.48800 | 0.450000 | 1.607 | 27.0 |
| | K: 0.000000 | | | |
| | A: −0.682872E−01, B: 0.783944E−01, | | | |
| | C: −0.231453E+00, D: 0.226580E+00 | | | |
| S6 | 3.28700 | t6 (Variable) | | |
| | K: 0.000000 | | | |
| | A: 0.595043E−01, B: 0.1410757E−01, | | | |
| | C: 0.243152E+00, D: −0.203210E+00 | | | |
| S7 | Infinite | 0.300000 | 1.517 | 64.2 |
| S8 | Infinite | 0.200000 | | |
| S9 | Infinite | 0.400000 | 1.517 | 64.2 |
| S10 | Infinite | 0.645866 | | |
| SI | Infinite | 0 | | |

Table 4 shows examples of the variable distances t2, t4, and t6 in the second embodiment of the present invention.

TABLE 4

| Variable distance | Wide-angle end | Medium-angle end | Telephoto end |
|---|---|---|---|
| t2 | 2.860 | 1.832 | 1.330 |
| t4 | 0.540 | 0.639 | 0.784 |
| t6 | 1.187 | 1.854 | 2.269 |

Figure 6A:
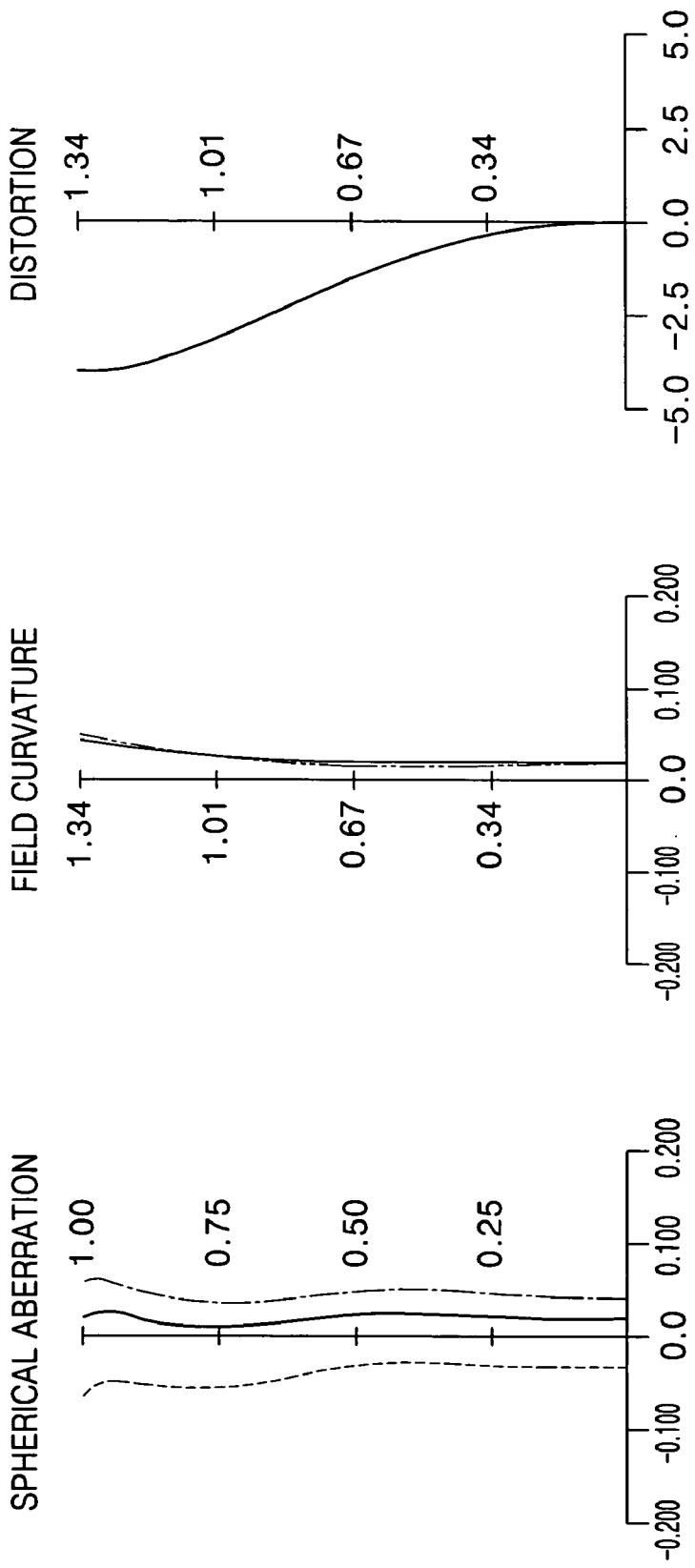
FIG. 6A illustrates spherical aberration, field curvature, and distortion at the wide-angle end of the zoom lens according to the second embodiment of the present invention.

FIG. 6A illustrates spherical aberration, field curvature, and distortion at the wide-angle end of the zoom lens according to the second embodiment of the present invention. FIG. 6B illustrates spherical aberration, field curvature, and distortion at the telephoto end of the zoom lens according to the second embodiment of the present invention. It can be seen from FIGS. 6A and 6B that aberration change is satisfactory.

<Third Embodiment>

Figure 7A:
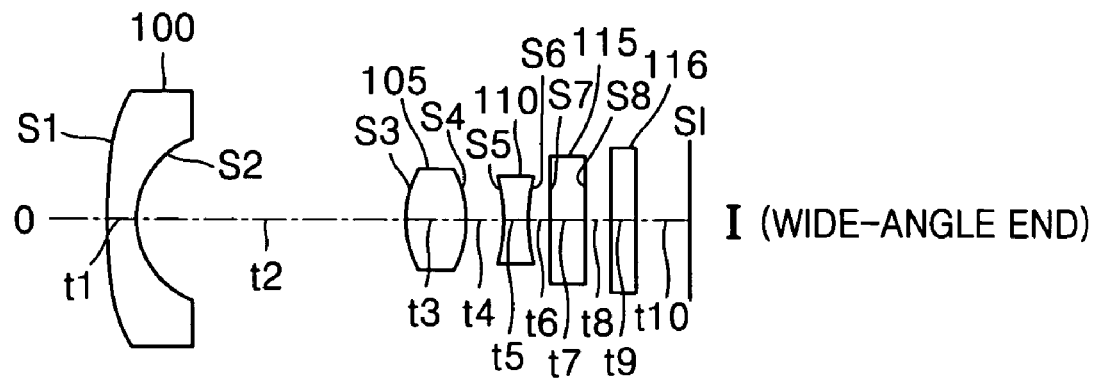
FIG. 7A illustrates optical disposition at a wide-angle end of a zoom lens according to a third embodiment of the present invention.
Figure 7B:
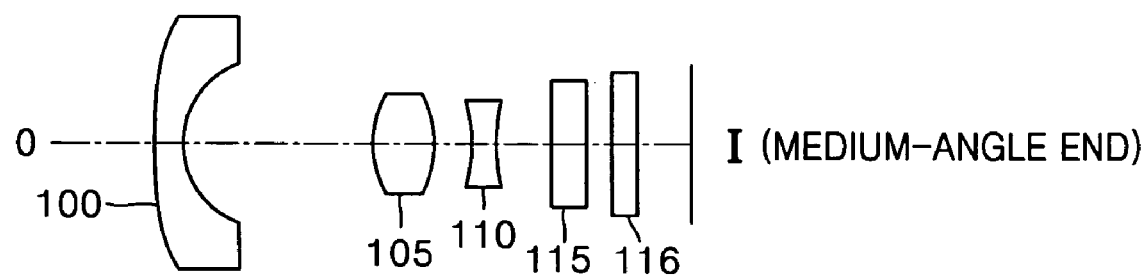
FIG. 7B illustrates optical disposition at a medium-angle end of the zoom lens according to the third embodiment of the present invention.
Figure 7C:
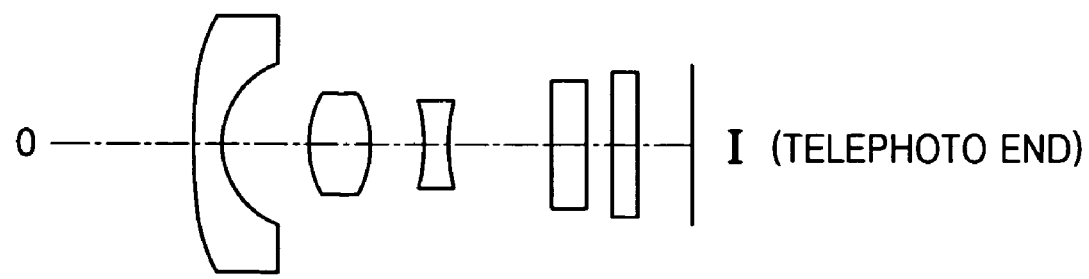
FIG. 7C illustrates optical disposition at a telephoto end of the zoom lens according to the third embodiment of the present invention.

FIGS. 7A through 7C illustrate structures of a zoom lens according to a third embodiment of the present invention.

TABLE 5 f: 1.81–2.53–4.46 Fno: 2.84–3.31–4.30 2ω: 73.81–55.75–32.54

| | R | t | ND | VD |
|---|---|---|---|---|
| S1 | 9.08400 | 0.450000 | 1.5247 | 56.2 |
| | K: 0.000000 | | | |
| | A: −0.294614E−02, B: 0.179930E−02, | | | |
| | C: −0.251304E−03, D: 0.735198E−04 | | | |
| S2 | 1.38000 | t2 (Variable) | | |
| | K: 0.000000 | | | |
| | A: −0.203793E−01, B: 0.640211E−02, | | | |
| | C: −0.133303E−01, D: 0.149379E−02 | | | |
| S3 (ST) | 1.48700 | 0.980000 | 1.5247 | 56.2 |
| | K: −0.336534 | | | |
| | A: −0.443602E−02, B: −0.314828E−01, | | | |
| | C: 0.400059E−02, D: −0.596606E−01 | | | |

TABLE 5-continued f: 1.81–2.53–4.46 Fno: 2.84–3.31–4.30 2ω: 73.81–55.75–32.54

| | R | t | ND | VD |
|---|---|---|---|---|
| S4 | −2.00700 | t4 (Variable) | | |
| | K: −0.340720 | | | |
| | A: 0.260252E−02, B: −0.233845E−01, | | | |
| | C: −0.437045E−01, D: −0.103127E−01 | | | |
| S5 | −1.98200 | 0.400000 | 1.607 | 27.0 |
| | K: 0.000000 | | | |
| | A: 0.131225E+00, B: −0.900002E−01, | | | |
| | C: 0.197618E−02, D: 0.154858E+00 | | | |
| S6 | 12.17500 | t6 (Variable) | | |
| | K: 0.000000 | | | |
| | A: 0.207066E+00, B: 0.384006E−01, | | | |
| | C: −0.232683E−02, D: 0.226322E+00 | | | |
| S7 | Infinite | 0.550000 | 1.517 | 64.2 |
| S8 | Infinite | 0.400000 | | |
| S9 | Infinite | 0.400000 | 1.517 | 64.2 |
| S10 | Infinite | 0.866383 | | |
| SI | Infinite | 0 | | |

Table 6 shows examples of the variable distances t2, t4, and t6 in the third embodiment of the present invention.

TABLE 6

| Variable distance | Wide-angle end | Medium-angle end | Telephoto end |
|---|---|---|---|
| t2 | 4.331 | 3.043 | 1.402 |
| t4 | 0.600 | 0.623 | 0.836 |
| t6 | 0.356 | 0.857 | 1.663 |

Figure 8B:
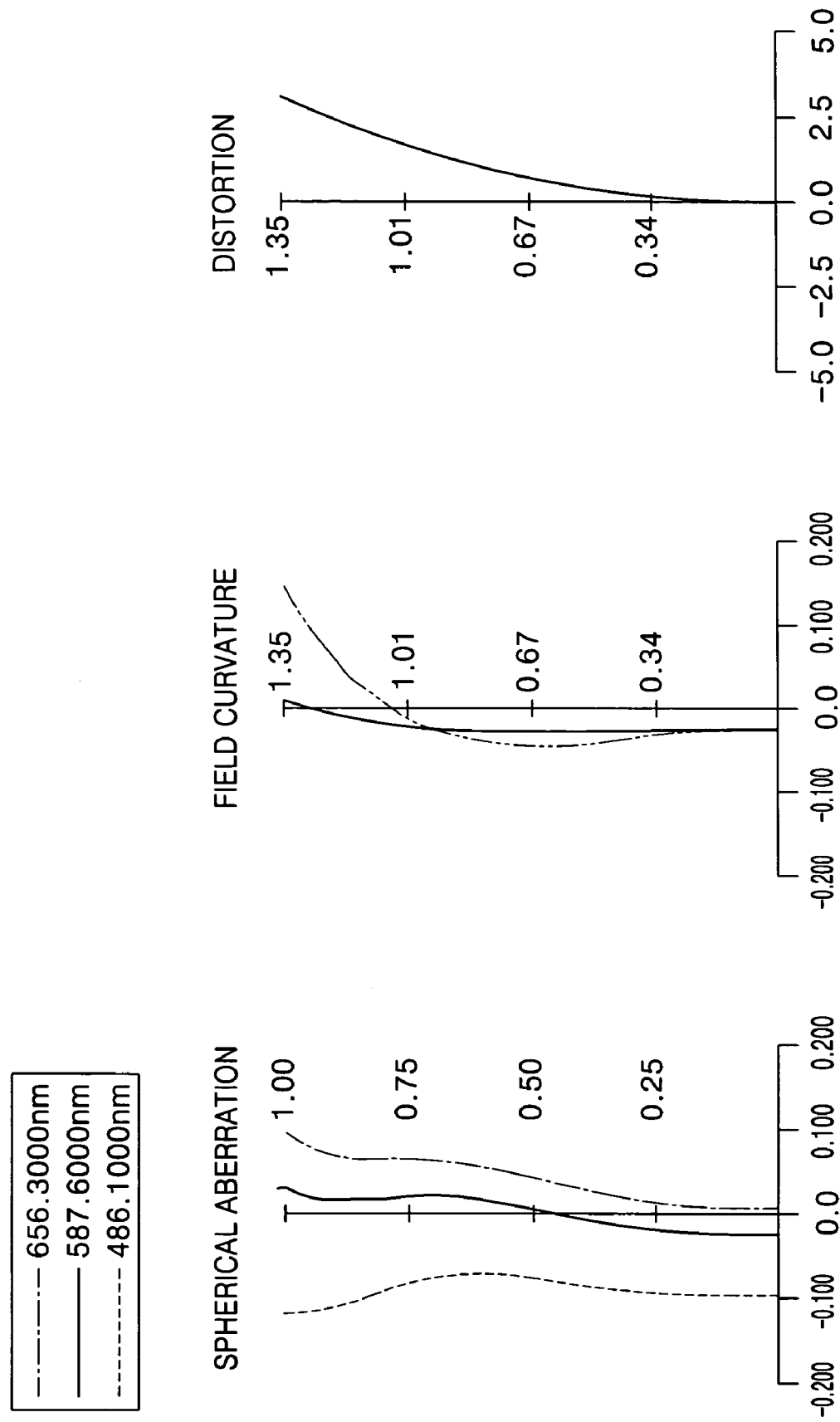
FIG. 8B illustrates spherical aberration, field curvature, and distortion at the telephoto end of the zoom lens according to the third embodiment of the present invention.

FIG. 8A illustrates spherical aberration, field curvature, and distortion at the wide-angle end of the zoom lens according to the third embodiment of the present invention. FIG. 8B illustrates spherical aberration, field curvature, and distortion at the telephoto end of the zoom lens according to the third embodiment of the present invention.

<Fourth Embodiment>

Figure 9A:
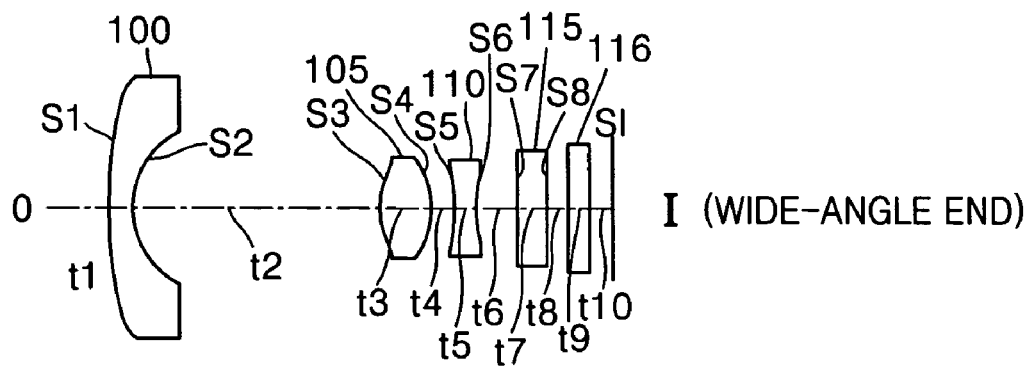
FIG. 9A illustrates optical disposition at a wide-angle end of a zoom lens according to a fourth embodiment of the present invention.
Figure 9B:
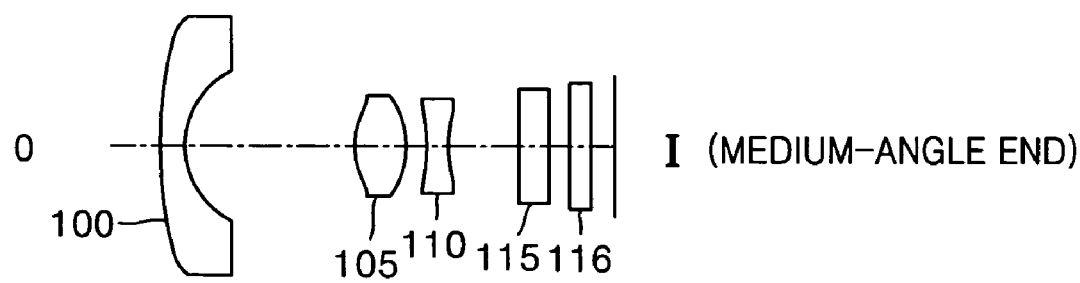
FIG. 9B illustrates optical disposition at a medium-angle end of the zoom lens according to the fourth embodiment of the present invention.
Figure 9C:
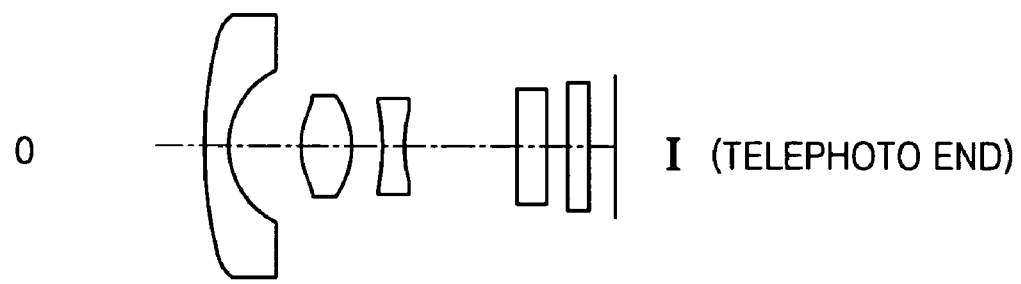
FIG. 9C illustrates optical disposition at a telephoto end of the zoom lens according to the fourth embodiment of the present invention.

FIGS. 9A through 9C illustrate structures of a zoom lens according to a fourth embodiment of the present invention.

TABLE 7 f: 1.77–2.47–4.36 Fno: 2.86–3.32–4.26 2ω: 76.37–56.19–32.84

| | R | T | ND | VD |
|---|---|---|---|---|
| S1 | 11.07600 | 0.450000 | 1.5247 | 56.2 |
| | K: 0.000000 | | | |
| | A: 0.179138E−01, B: −0.866436E−02, | | | |
| | C: 0.144295E−02, D: −0.578286E−04 | | | |
| S2 | 1.57300 | t2 (Variable) | | |
| | K: 0.000000 | | | |
| | A: 0.230304E−01, B: −0.123879E−01, | | | |
| | C: −0.754553E−02, D: 0.152176E−02 | | | |
| S3 (ST) | 1.41000 | 0.950000 | 1.5247 | 56.2 |
| | K: −0.192438 | | | |
| | A: −0.452768E−01, B: −0.596380E−01, | | | |
| | C: 0.453506E−01, D: −0.137558E+00 | | | |
| S4 | −1.91500 | t4 (Variable) | | |
| | K: −0.638410 | | | |
| | A: 0.236462E−01, B: −0.690051E−01, | | | |
| | C: −0.670726E−01, D: 0.332103E−01 | | | |
| S5 | −2.32700 | 0.400000 | 1.607 | 27.0 |
| | K: 0.000000 | | | |
| | A: 0.177263E+00, B: −0.158128E+00, | | | |
| | C: −0.344872E+00, D: 0.578867E+00 | | | |
| S6 | 4.63100 | t6 (Variable) | | |
| | K: 0.000000 | | | |
| | A: 0.284342E+00, B: −0.140979E+00, | | | |
| | C: 0.229327E+00, D: −0.579137E−01 | | | |

TABLE 7-continued f: 1.77–2.47–4.36 Fno: 2.86–3.32–4.26 2ω: 76.37–56.19–32.84

| | R | T | ND | VD |
|---|---|---|---|---|
| S7 | Infinite | 0.550000 | 1.517 | 64.2 |
| S8 | Infinite | 0.400000 | | |
| S9 | Infinite | 0.400000 | 1.517 | 64.2 |
| S10 | Infinite | 0.431097 | | |
| SI | Infinite | 0 | | |

Table 8 shows examples of the variable distances t2, t4, and t6 in the fourth embodiment of the present invention.

TABLE 8

| Variable distance | Wide-angle end | Medium-angle end | Telephoto end |
|---|---|---|---|
| t2 | 4.685 | 3.239 | 1.400 |
| t4 | 0.447 | 0.451 | 0.590 |
| t6 | 0.787 | 1.276 | 2.097 |

Figure 10A:
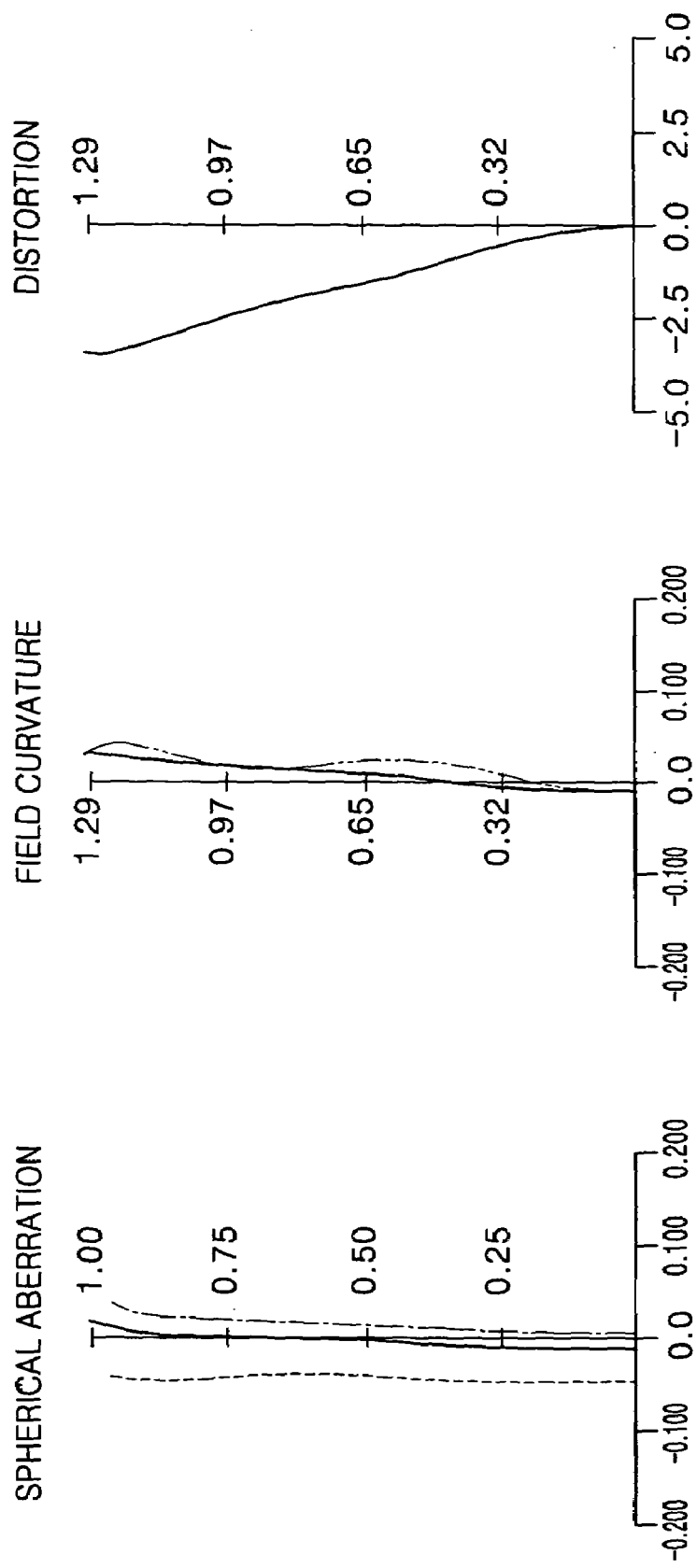
FIG. 10A illustrates spherical aberration, field curvature, and distortion at the wide-angle end of the zoom lens according to the fourth embodiment of the present invention.

FIG. 10A illustrates spherical aberration, field curvature, and distortion at the wide-angle end of the zoom lens according to the fourth embodiment of the present invention. FIG. 10B illustrates spherical aberration, field curvature, and distortion at the telephoto end of the zoom lens according to the fourth embodiment of the present invention.

<Fifth Embodiment>

Figure 11A:
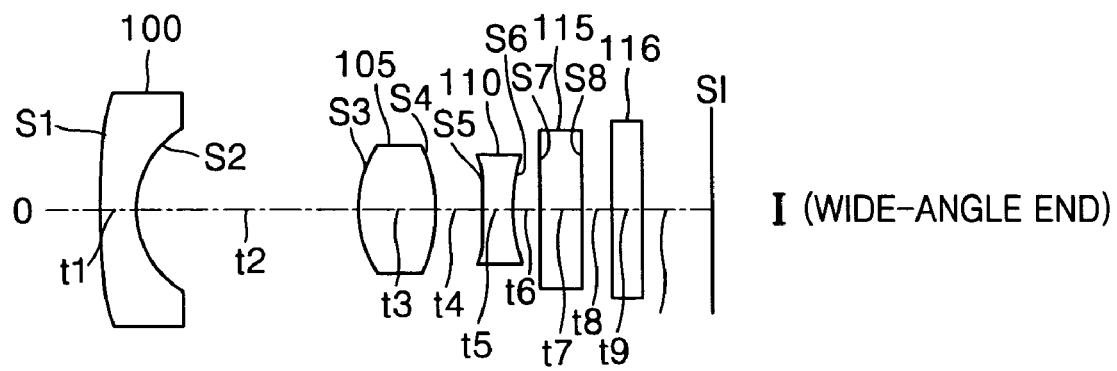
FIG. 11A illustrates optical disposition at a wide-angle end of a zoom lens according to a fifth embodiment of the present invention.
Figure 11B:
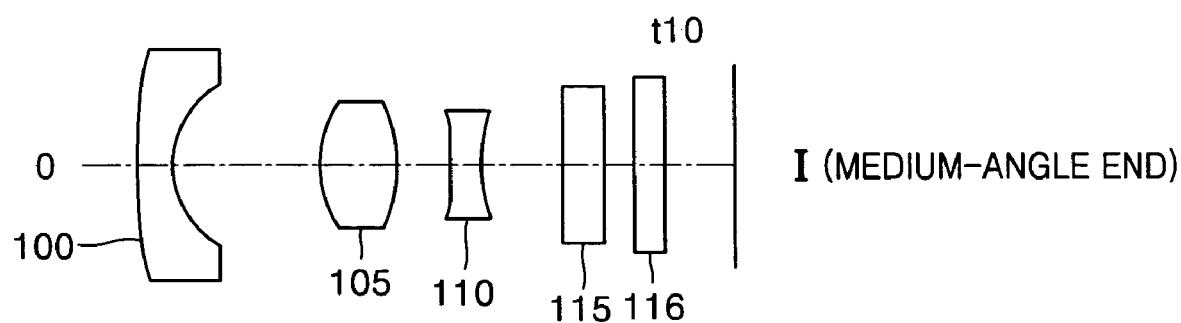
FIG. 11B illustrates optical disposition at a medium-angle end of the zoom lens according to the fifth embodiment of the present invention.
Figure 11C:
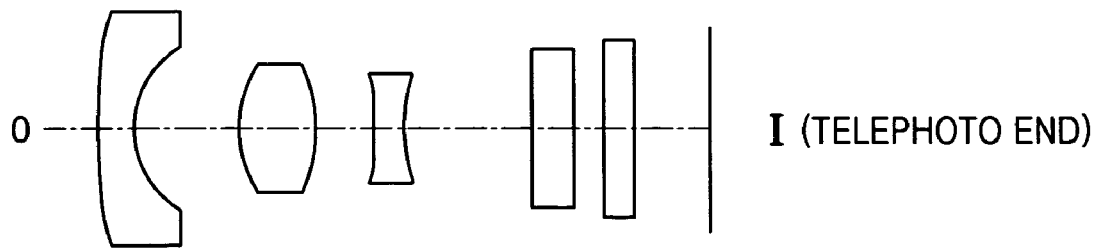
FIG. 11C illustrates optical disposition at a telephoto end of the zoom lens according to the fifth embodiment of the present invention.

FIGS. 11A through 11C illustrate structures of a zoom lens according to a fifth embodiment of the present invention.

TABLE 9 f: 2.13–3.20–4.2619 Fno: 2.89–3.61–4.28 2ω: 66.38–45.53–34.36

| | R | T | ND | VD |
|---|---|---|---|---|
| S1 | 7.80900 | 0.470000 | 1.5247 | 56.2 |
| | K: 0.000000 | | | |
| | A: −0.280418E−01, B: 0.224581E−01, | | | |
| | C: −0.583664E−02, D: 0.706179E−03 | | | |
| S2 | 1.20400 | t2 (Variable) | | |
| | K: 0.000000 | | | |
| | A: −0.573110E−01, B: 0.337406E−01, | | | |
| | C: −0.284091E−01, D: 0.143394E−01 | | | |
| S3 (ST) | 1.35400 | 1.000000 | 1.5247 | 56.2 |
| | K: −0.334581 | | | |
| | A: −0.431923E−01, B: −0.145271E−01, | | | |
| | C: −0.548452E−02, D: −0.488089E−01 | | | |
| S4 | −2.63000 | t4 (Variable) | | |
| | K: 2.070253 | | | |
| | A: −0.435529E−01, B: 0.478084E−01, | | | |
| | C: −0.903417E−01, D: 0.280999E−01 | | | |
| S5 | 9.92000 | 0.400000 | 1.607 | 27.0 |
| | K: 0.000000 | | | |
| | A: −0.487796E+00, B: 0.449262E+00, | | | |
| | C: −0.979384E+00, D: 0.106765E+01 | | | |
| S6 | 1.66600 | t6 (Variable) | | |
| | K: 0.000000 | | | |
| | A: −0.380638E+00, B: 0.600693E+00, | | | |
| | C: −0.745534E+00, D: 0.683815E+00 | | | |
| S7 | Infinite | 0.550000 | 1.517 | 64.2 |
| S8 | Infinite | 0.400000 | | |
| S9 | Infinite | 0.400000 | 1.517 | 64.2 |
| S10 | Infinite | 0.884658 | | |
| SI | Infinite | 0 | | |

Table 10 shows examples of the variable distances t2, t4, and t6 in the fifth embodiment of the present invention.

TABLE 10

| Variable distance | Wide-angle end | Medium-angle end | Telephoto end |
|---|---|---|---|
| t2 | 2.924 | 1.922 | 1.400 |
| t4 | 0.617 | 0.677 | 0.749 |
| t6 | 0.347 | 1.044 | 1.684 |

Figure 12A:
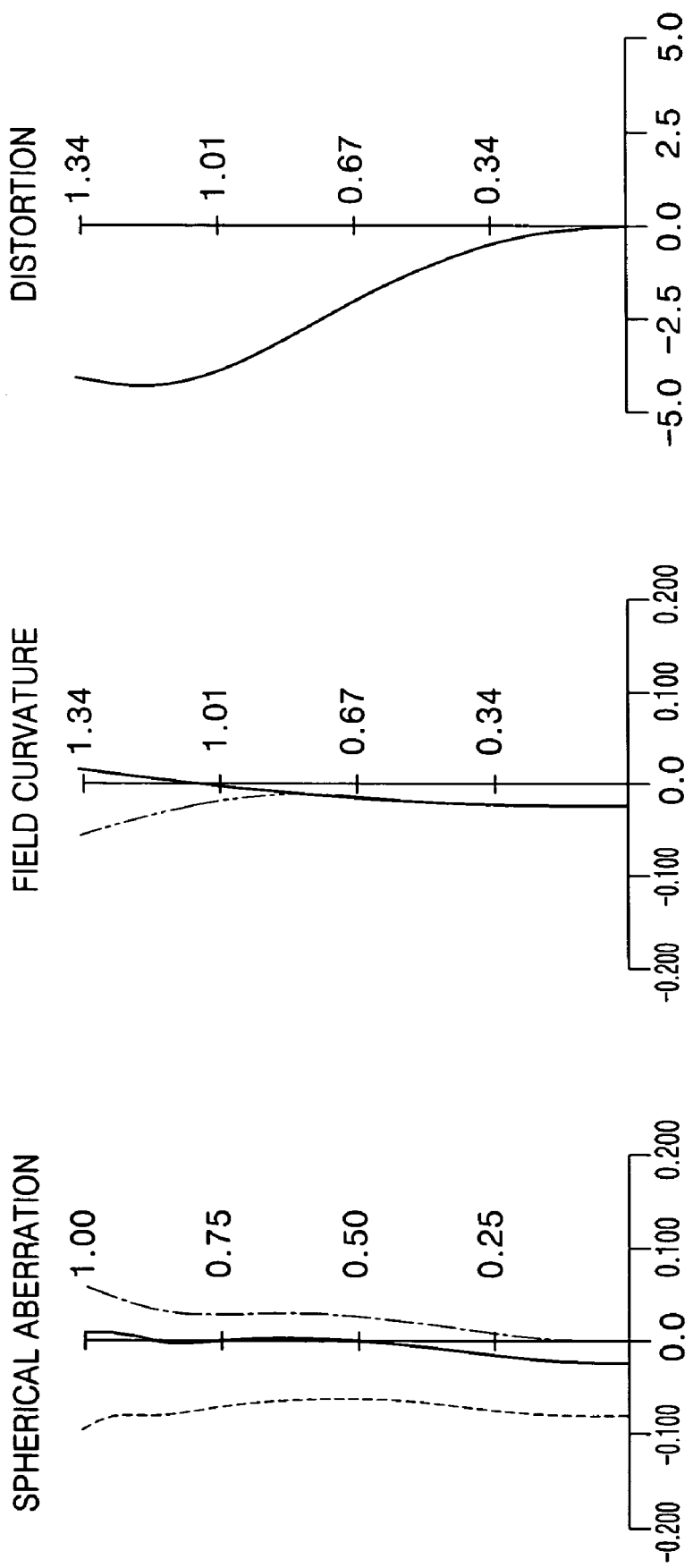
FIG. 12A illustrates spherical aberration, field curvature, and distortion at the wide-angle end of the zoom lens according to the fifth embodiment of the present invention.
Figure 12B:
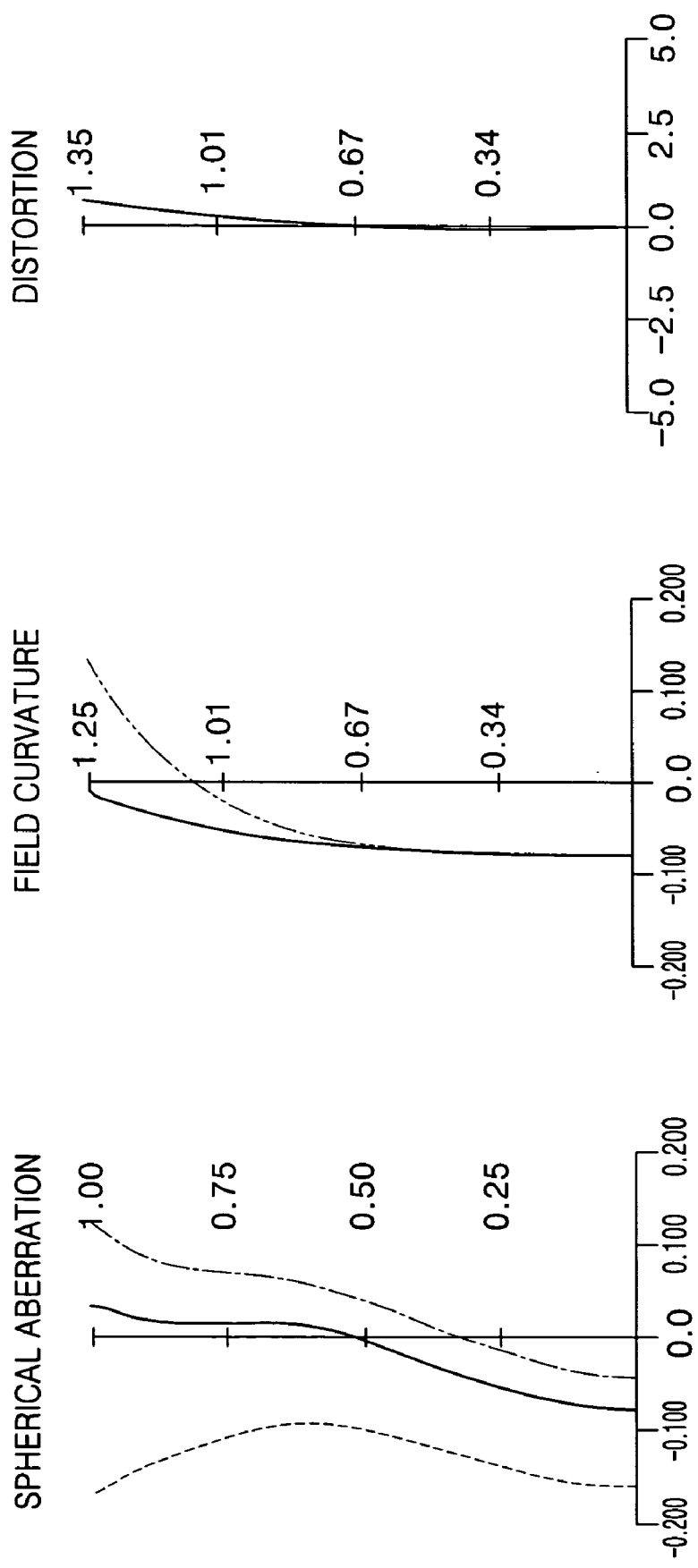
FIG. 12B illustrates spherical aberration, field curvature, and distortion at the telephoto end of the zoom lens according to the fifth embodiment of the present invention.

FIG. 12A illustrates spherical aberration, field curvature, and distortion at the wide-angle end of the zoom lens according to the fifth embodiment of the present invention. FIG. 12B illustrates spherical aberration, field curvature, and distortion at the telephoto end of the zoom lens according to the fifth embodiment of the present invention.

Table 11 shows results of Formulae (1) through (5) in the first through fifth embodiments.

TABLE 11

|  | First embodiment | Second embodiment | Third embodiment | Fourth embodiment | Fifth embodiment |
|---|---|---|---|---|---|
| Formula (1) | 4.698 | 4.061 | 5.183 | 5.389 | 3.773 |
| Formula (2) | 1.044 | 0.930 | 0.997 | 0.970 | 0.876 |
| Formula (3) | 1.584 | 1.266 | 1.751 | 2.007 | 1.306 |
| Formula (4) | 2.958 | 1.995 | 1.528 | 1.403 | 1.569 |
| Formula (5) | 0.858 | 0.647 | 0.767 | 0.892 | 0.568 |

Referring to Table 11, the zoom lenses according to the first through fifth embodiments satisfy all of the conditions expressed by Formulae (1) through (5).

Meanwhile, in embodiments of the present invention, an image-side plane the first lens group 100 may be concave, the second lens group 105 may be double convex, and an object-side plane of the third lens group 110 may be concave. In addition, at least one lens group among the first through third lens groups 100, 105, and 110 may have an aspherical shape. All of the first through third lens groups 100, 105, and 110 may have the aspherical shape.

The aspherical shape of the zoom lenses according to the first through fifth embodiments of the present invention can be expressed by Formula (6) when an optical axis is set as an X-axis, a line perpendicular to the optical axis is set as a Y-axis, and a progressing direction of a light beam is defined as being positive.

$$x = \frac{cy^2}{1 + \sqrt{1 - (K+1)c^2 y^2}} + Ay^4 + By^6 + Cy^8 + Dy^{10} \quad (6)$$

Here, "x" is a coordinate from a vertex of a lens in an X-axis direction, "y" is a coordinate from the vertex of the lens in a Y-axis direction, and K is a conic constant. A, B, C, and D are aspheric coefficients, and "c" is a reciprocal of the radius of curvature, 1/R, at the vertex of the lens.

As described above, when aspherical lenses are appropriately arranged, mass production of zoom lenses is possible with a low manufacturing price.

In a zoom lens, fundamental design including configuration of refractive power of the optical system and a position of a diaphragm is very important. In addition, it is important to make mass production of zoom lenses using an aspherical lens possible. In the present invention, optimal refractive power of each lens group and a position of a diaphragm are set considering these important matters so that high magnification is obtained with a minimum number of lenses. As a result, a compact zoom lens can be realized. Since the present invention miniaturizes a zoom lens, it is usefully applied to portable information terminals, mobile compact cameras, and so on.

What is claimed is:

1. A zoom lens comprising:
    a first lens group having a negative refractive power;
    a second lens group having a positive refractive power; and
    a third lens group having a negative refractive power,
    wherein the first through third lens groups are sequentially arranged from an object side toward an image side,
    wherein at least the second lens group is moved along an optical axis in order to change magnification, and
    wherein $$3.7 < \frac{L_T}{F_W} < 5.4$$

is satisfied, where $L_T$ denotes a distance on the optical axis from an object-side plane of the first lens group to an image plane at a wide-angle end, and $F_W$ denotes an overall focal length of the zoom lens at the wide-angle end.

2. The zoom lens of claim 1, wherein when a focal length of the first lens group is represented with $F_1$, the first lens group satisfies $$1.20 < \left|\frac{F_1}{F_W}\right| < 2.10.$$

3. The zoom lens of claim 1, wherein when a focal length of the third lens group is represented with $F_3$, the third lens group satisfies $$1.38 < \left|\frac{F_3}{F_W}\right| < 3.00.$$

4. The zoom lens of claim 1, wherein when a focal length of the second lens group is represented with $F_2$, the second lens group satisfies $$0.85 < \left|\frac{F_2}{F_W}\right| < 1.20.$$

5. The zoom lens of claim 1, wherein the first and third lens groups move in association with the second lens group to compensate for a shift of a focus position that occurs during magnification change.

6. The zoom lens of claim 1, wherein when a radius of curvature of an image-side plane of the first lens group is represented with G1B, the first lens group satisfies $$0.50 < \frac{G1B}{F_W} > 0.95.$$

7. The zoom lens of claim 1, wherein each of the first through third lens groups consists of a single lens.

8. The zoom lens of claim 7, wherein the image-side plane of the first lens group is concave, the second lens group is double convex, and an object-side plane of the third lens group is concave.

9. The zoom lens of claim 1, wherein at least one lens group comprises an aspherical lens.

10. The zoom lens of claim 1, further comprising a diaphragm fixed on either an image-side plane and or object-side plane of the second lens group.

11. A zoom lens comprising:
a first lens group having a negative refractive power;
a second lens group having a positive refractive power; and
a third lens group having a negative refractive power,
wherein the first through third lens groups are sequentially arranged from an object side toward an image side,
wherein at least the second lens group is moved along an optical axis to change magnification, and
wherein $$0.85 < \left|\frac{F_2}{F_W}\right| < 1.20$$

is satisfied, where $F_2$ denotes a focal length of the second lens group, and $F_W$ denotes an overall focal length of the zoom lens at a wide-angle end.

12. The zoom lens of claim 11, wherein when a focal length of the first lens group is represented with $F_1$, the first lens group satisfies $$1.20 < \left|\frac{F_1}{F_W}\right| < 2.10.$$

13. The zoom lens of claim 11, wherein when a focal length of the third lens group is represented with $F_3$, the third lens group satisfies $$1.38 < \left|\frac{F_3}{F_W}\right| < 3.00.$$

14. The zoom lens of claim 11, wherein the first and third lens groups move in association with the second lens group to compensate for a shift of a focus position that occurs during magnification change.

15. The zoom lens of claim 11, wherein when a radius of curvature of an image-side plane of the first lens group is represented with G1B, the first lens group satisfies $$0.50 < \frac{G1B}{F_W} > 0.95.$$

16. The zoom lens of claim 11, wherein each of the first through third lens groups consists of a single lens.

17. The zoom lens of claim 16, wherein the image-side plane of the first lens group is concave, the second lens group is double convex, and an object-side plane of the third lens group is concave.

18. The zoom lens of claim 11, wherein $$3.7 < \frac{L_T}{F_W} < 5.4$$

is satisfied, where $L_T$ denotes a distance on the optical axis from an object-side plane of the first lens group to an image plane at a wide-angle end, and $F_W$ denotes an overall focal length of the zoom lens at the wide-angle end.

19. A zoom lens comprising:
a first lens group having a negative refractive power;
a second lens group having a positive refractive power; and
a third lens group having a negative refractive power,
wherein the first through third lens groups are sequentially arranged from an object side toward an image side,
wherein at least the second lens group is moved along an optical axis to change magnification, and
wherein the first lens group satisfies $$1.20 < \left|\frac{F_1}{F_W}\right| < 2.10,$$

where $F_1$ denotes a focal length of the first lens group and $F_W$ denotes an overall focal length of the zoom lens at a wide-angle end.

20. The zoom lens of claim 19, wherein when a focal length of the third lens group is represented with $F_3$, the third lens group satisfies $$1.38 < \left|\frac{F_3}{F_W}\right| < 3.00,$$

wherein $$0.85 < \left|\frac{F_2}{F_W}\right| < 1.20$$

is satisfied, where $F_2$ denotes a focal length of the second lens group, and $F_W$ denotes an overall focal length of the zoom lens at a wide-angle end, wherein $$3.7 < \frac{L_T}{F_W} < 5.4$$

is satisfied, where $L_T$ denotes a distance on the optical axis from an object-side plane of the first lens group to an image plane at a wide-angle end, and $F_W$ denotes an overall focal length of the zoom lens at the wide-angle end,
 wherein when a radius of curvature of an image-side plane of the first lens group is represented with G1B, the first lens group satisfies and $$0.50 < \frac{G1B}{F_W} > 0.95,$$

wherein each of the first through third lens groups consists of a single lens.

* * * * *